O. D. WOODRUFF.
FOOD CHOPPER.
APPLICATION FILED DEC. 6, 1909.
953,935.
Patented Apr. 5, 1910.
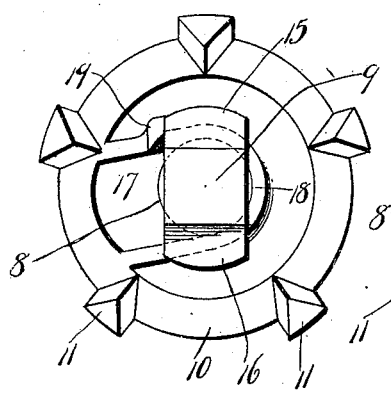
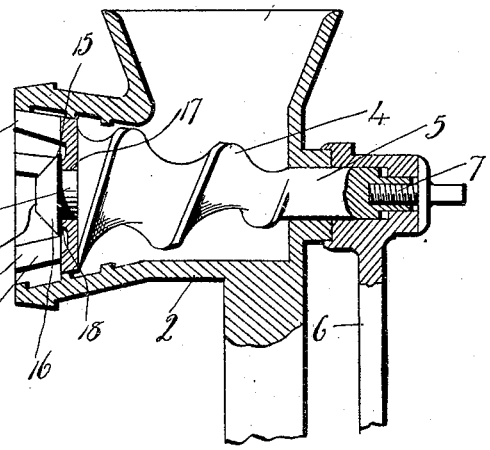
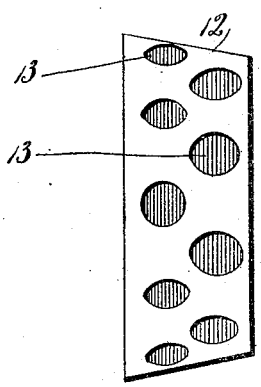
Witnesses
C. J. Reed
C. L. Reed
Inventor
Oliver D. Woodruff
by Seymour Earle
Atty

UNITED STATES PATENT OFFICE.

OLIVER D. WOODRUFF, OF SOUTHINGTON, CONNECTICUT.

FOOD-CHOPPER.

953,935.  Specification of Letters Patent.  Patented Apr. 5, 1910.

Application filed December 6, 1909. Serial No. 531,552.

*To all whom it may concern:*

Be it known that I, OLIVER D. WOODRUFF, a citizen of the United States, residing at Southington, in the county of Hartford and State of Connecticut, have invented a new and useful Improvement in Food-Choppers; and I do hereby declare the following, when taken in connection with the accompanying drawings and the numerals of reference marked thereon, to be a full, clear, and exact description of the same, and which said drawings constitute part of this specification, and represent, in—

Figure 1 a sectional view illustrating a food chopper embodying my invention. Fig. 2 a front view of one form of cutter adapted for use therewith. Figs. 3 and 4 are side views of other forms of cutters adapted to be substituted for the cutter shown in Figs. 1 and 2.

This invention relates to an improvement in food choppers and particularly to the type in which the screw is entered and removed through the outer end of the casing, and is an improvement on the food chopper for which Letters Patent of the United States No. 518,047 were granted April 10, 1894.

In the use of food choppers it is desirable to have a variety of cutters, and usually three are provided. Generally the cutters are formed integral with the forcing screw, but the ends or cutting portions have been formed independent of the screw and attached thereto.

The object of this invention is to provide simple means for attaching the cutters to the forcing screw so that one cutter may be removed and another attached without the use of independent attaching means, such as thumb screws, which are liable to become misplaced; and the invention consists in certain details of construction and combinations of parts as will be hereinafter described and particularly recited in the claims.

In carrying out my invention I employ a casing or body 2 having the usual mouth or hopper 3. The casing or body is larger at its outer end than at its inner end, and the screw or forcer 4 is inserted through the outer end of the casing and provided with a journal 5 to which the handle 6 is attached by a thumb screw 7. The forcer 4 instead of being formed with a cutter at its outer end, is shorter than the length of the casing, and is provided with a centrally arranged neck 8 and an oblong button or head 9 by which the cutter 10 may be attached to the screw. The head corresponds substantially in width to the diameter of the neck, but is longer than its width forming over-hanging ends 15 and 16.

The cutter may be of any of the well known forms. Thus it may be of substantial cup-shape with outwardly projecting flaring cutting fingers 11 as shown in Figs. 1 and 2 of the drawings, the flare of the fingers corresponding to the taper of the outer end of the casing. Or the cutter may have its side walls 12 formed with perforations 13 as shown in Fig. 3 of the drawings, or it may have spiral grooves 14 as shown in Fig. 4 of the drawings, these spirals forming a continuation of the spirals on the screw 4. In the bottom of these cutters I form a slot 17 corresponding in length and width to the length and width of the head 9 so that the cutter may be set over the head, and the inner end of the slot is semi-circular so as to closely fit the neck 8 when the cutter is concentric with the outer end of the forcing screw.

Preferably I form an outwardly projecting rib 18 around the slot 17 and also provide a stop lug 19. The lug 19 is in position to be engaged by one side of the head so that when the screw is turned in the direction for cutting, the head will engage with the lug 19 and turn the cutter. By causing the head to engage with the stop lug 19 the cup-like cutter is necessarily drawn into a concentric position relative to the feed screw and will be held concentric with the case so that there is no danger of wearing at one point more than another as is liable if the cup-like cutter is not firmly held in position. The object of the rib is to provide for fitting. The face of the cup is ground flat so as to closely fit against the outer end of the forcing screw, and then if the outer edge of the rib 18 will not pass beneath the over-hanging ends 15 and 16 of the head 9, the surfaces of this rib may be ground or cut down so that it will pass beneath the heads, it being desirable that there should be but little, if any, play between the cutter and the head, and this rib may be conveniently trimmed down if necessary. One of the cutters 9 is connected with the forcing screw by passing the head 9 of the screw through the slot 17 and then inserting the screw into the casing in the usual way. It is not necessary that the cutter should be held in its proper relation with the screw when it is entered into the casing as the casing will guide the cutter to a central position and when the screw is turned one end of the head will come against the lug 19 and force the cutter to a central position, and when once in the case and the screw connected with the handle the cutter cannot by any possibility be removed, yet if it is desired to change the cutter it is only necessary to loosen the screw so that its outer end may be moved sufficiently forward to enable one cutter to be detached and another one attached.

With this construction I am enabled to furnish a casing and a single forcing screw with a variety of cutters, and the cutters are connected with the forcing screw without separable means so that there are no parts to be lost, and the cutters may be attached by the most inexperienced persons.

I claim:—

1. A food chopper comprising a casing having an outwardly flaring body, a forcing screw mounted in said body, said screw shorter than the body and formed with an outwardly projecting neck and an elongated head, and a cutter corresponding in diameter to the diameter of the outer end of the casing into which it is adapted to pass, an elongated slot in the bottom of said cutter corresponding substantially in form to the form of the said head which is adapted to be turned so as to extend over the sides of the slot, and a stop lug at one side of said slot to engage with one side of said head to cause the rotation of the cutter and to prevent movement of said cutter longitudinally during the cutting operation.

2. A food chopper comprising a casing having an outwardly flaring body, a forcing screw mounted in said body, said screw shorter than the body and provided with an outwardly projecting neck and an elongated head, a cup-like cutter formed with an elongated slot through which said head may pass and so that when turned the head will extend across said slot the inner end of the slot concentric with the bottom of the cutter and a stop-lug at one side of said slot to be engaged by one side of said head to cause the rotation of the cutter and prevent movement of the cutter longitudinally of the slot during the cutting operation.

In testimony whereof, I have signed this specification in the presence of two subscribing witnesses.

OLIVER D. WOODRUFF.

Witnesses:
 FREDERIC C. EARLE,
 CLARA L. WEED.